J. A. MEISER.
COMBINED SHUTTER AND FINDER FOR PHOTOGRAPHIC CAMERAS.
APPLICATION FILED OCT. 20, 1908.

924,088.

Patented June 8, 1909.

WITNESSES.
Arthur L. Slee
S. Constine

INVENTOR.
Jesse A. Meiser
by Wm. F. Booth
his Attorney

UNITED STATES PATENT OFFICE.

JESSE A. MEISER, OF EUREKA, CALIFORNIA, ASSIGNOR OF ONE-FOURTH TO JOHN A. PRENTICE, OF EUREKA, CALIFORNIA.

COMBINED SHUTTER AND FINDER FOR PHOTOGRAPHIC CAMERAS.

No. 924,088.

Specification of Letters Patent.

Patented June 8, 1909.

Application filed October 20, 1908. Serial No. 458,710.

*To all whom it may concern:*

Be it known that I, JESSE A. MEISER, a citizen of the United States, residing at Eureka, in the county of Humboldt and State of California, have invented certain new and useful Improvements in Combined Shutters and Finders for Photographic Cameras, of which the following is a specification.

My invention relates to the general class of photographic cameras, and particularly to parts thereof or attachments thereto which have for their object the convenient "finding" or observation of the image on the ground-glass, and the timely exposure of the plate conformably to such observation. The device may, therefore, be properly termed a combined shutter and finder, and though it may be applied to any camera, its especial advantage is in connection with a portrait camera in that it affords opportunity for the operator to most conveniently observe the image a difficult subject, a child for example, without himself distracting the attention of the subject; and at the critical moment to expose the plate, by means of a shutter which is so arranged as to permit the slide of the plate-holder to be at any time previously withdrawn, thereby leaving the plate in readiness to be exposed, when, by observation, in the finder, the proper moment arrives.

These are the objects of my invention and to these ends my invention consists in the novel combined shutter and finder, which I shall now fully describe, by reference to the accompanying drawings in which—

Figure 1:
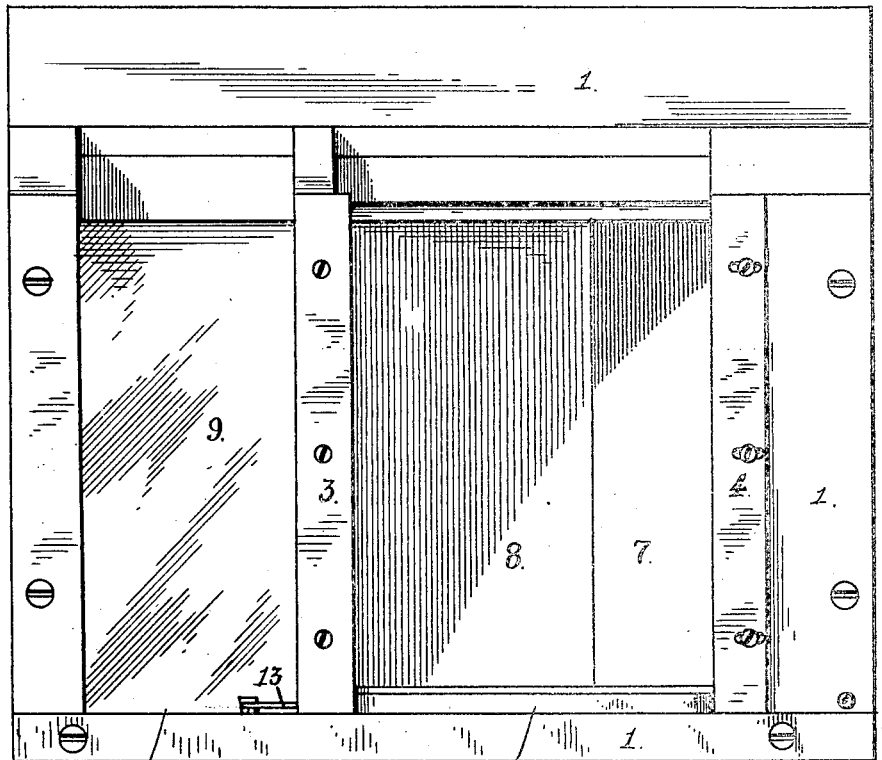
Figure 2:
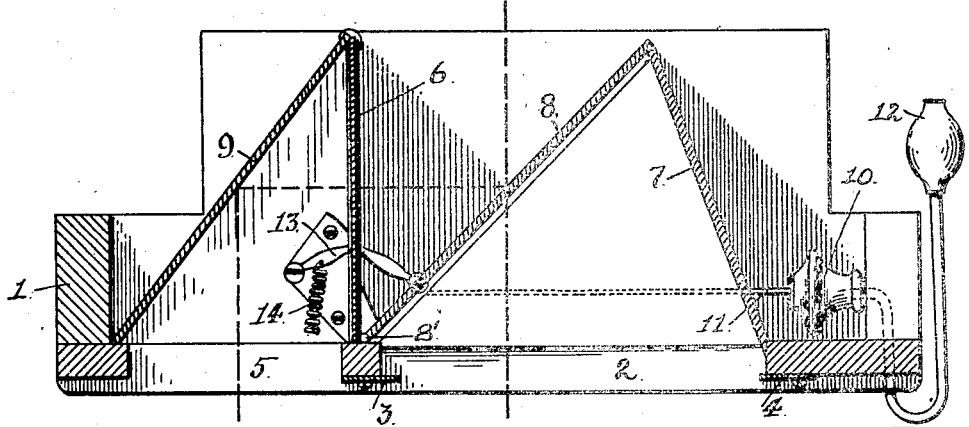

Figure 1 is an elevation of my apparatus. Fig. 2 is a horizontal section of the same, the dotted lines showing the several courses and reflections of the light.

The device best takes the form of an attachment to the back of the camera, though it may, of course, form an original part of its construction. As an attachment, it has a frame 1, which on its inner side is so formed that it may make, in any suitable manner, a light-tight connection with the camera-box, which it is not necessary herein to show.

The outer face of the frame 1 is formed with a seat 2 to receive a plate-holder, (not shown) which may be held in its place by any suitable means, as, for example, by the fixed flange 3 on one side and the adjustable flange 4 on the other side. Adjoining the plate-holder seat 2 in the outer face of frame 1 is the finder-opening 5 which is large enough to permit observation of the full sized image. Dividing the frame 1 between the plate holder seat and the finder-opening is the ground-glass 6, which lies parallel with the side of the bellows chamber of the camera, instead of crossing the back of said chamber as customary. Extending inwardly from the opposite side of the plate-holder seat is a fixed wall 7, the surface of which by painting or by covering with black cloth is made non-actinic. The ground-glass 6 and the wall 7 thus form between them an extension of the bellows chamber of the camera, so that the image will fall upon a plate, when exposed in the plate-holder, which is to be fitted to the seat 2. The shutter which controls this extension space is designated by 8. This shutter is a mirror, its reflecting surface being on its inner side. Its outer surface is best made black to properly darken the plate-holder chamber behind it. The shutter extends diagonally between the inner edge of the wall 7 and the outer edge of the ground-glass 6, and lies at such an angle when closed, as to reflect the image squarely to the ground-glass, as shown by the dotted line. It is hinged at its outer edge at 8' so that in swinging open, its inner edge leaves the wall 7 and the shutter opens to a position approximately parallel with the ground glass. The several surfaces with which it comes in contact at its limits of movement, both in opening and closing should be suitably cushioned so that jar and noise are avoided. Extending from the inner edge of the ground-glass 6, diagonally to the outer edge of the finder opening 5, is a second mirror 9, the reflecting surface of which is exposed to said opening. The angle of this mirror is such as to reflect the image from the ground-glass backwardly to the eyes of the operator, as shown by the dotted line.

Any suitable means may be provided to operate the shutter 8. I have here shown a rubber bellows 10 within the frame, connected by a push-rod 11 with the lower edge of the shutter. A pneumatic hand-bulb 12 is suitably connected with the bellows 10. The operation of this bulb opens the shutter, with a varying speed depending on the pressure. The shutter is closed by a toggle-lever 13, affected by a spring 14.

The operation of the device is as follows:—The shutter being closed, the plate-holder is fitted to its seat 2, and the slide is drawn, so that the plate is ready for light-exposure. It is, however, perfectly safe in this position as no light can reach it as long as the shutter is closed. The image thrown by the open lens of the camera falls on the mirrored surface of the shutter, and is reflected on the ground-glass 6. The operator sees this image in the mirror 9. The position of the operator is a very advantageous one, in that he does not by any of his movements distract the attention of the subject, and he can patiently await the moment, when, as revealed to him by the full image directly before him, the proper pose and expression are present. Then without more ado he instantly operates the shutter and exposes the plate, the dotted line showing the direct course of the light to the plate.

Having thus described my invention what I claim as new and desire to secure by Letters Patent is:—

1. A combined shutter and finder for photographic cameras, comprising a frame having in its rear face a plate-holder seat and a finder-opening arranged side by side; a movable shutter within the frame disposed to control the projection of the image from the camera lens to the plate, said shutter having an inner reflecting surface; a ground-glass within the frame arranged to receive the reflected image from the shutter when the latter is closed; and a second reflecting surface within the frame arranged to reflect the image from the ground-glass to the finder-opening.

2. A combined shutter and finder for photographic cameras, comprising a frame having in its rear face a plate-holder seat and finder-opening arranged side by side; a fixed wall and a swinging shutter arranged within the frame to form a plate-exposing chamber, controlled by the swinging of the shutter, said shutter having its inner surface, which is exposed to the camera, a reflecting one; a ground-glass arranged in the frame to receive the reflected image from the shutter when closed; and a mirror within the frame to reflect the image from the ground-glass to the finder-opening.

3. A combined shutter and finder for photographic cameras, comprising a frame having in its rear face a plate-holder seat and finder-opening arranged side by side; a ground-glass extending inwardly in said frame in a plane between said seat and opening; a wall extending inwardly in the frame from the outer side of the plate-holder seat; a mirror extending from the inner edge of the ground-glass to the outer side of the finder opening with its reflecting surface exposed to said opening; and a swinging shutter extending between the outer edge of the ground-glass and the inner edge of the wall; the inner surface of said shutter exposed to the ground-glass being a mirror.

In testimony whereof I have signed my name to this specification in the presence of two subscribing witnesses.

JESSE A. MEISER.

Witnesses:
   JOHN S. DEUEL,
   G. A. McLEAN.